US007013925B1

(12) United States Patent
Saveliev et al.

(10) Patent No.: US 7,013,925 B1
(45) Date of Patent: Mar. 21, 2006

(54) ACCUMULATOR TANK ASSEMBLY AND METHOD

(75) Inventors: Michael Saveliev, Huntington Beach, CA (US); Steven T. Jersey, Laguna Niguel, CA (US)

(73) Assignee: SHURflo, LLC, Cypress, CA (US)

( * ) Notice: Subject to any disclaimer, the term of this patent is extended or adjusted under 35 U.S.C. 154(b) by 0 days.

(21) Appl. No.: 10/991,958

(22) Filed: Nov. 18, 2004

(51) Int. Cl.
*F16L 55/04* (2006.01)

(52) U.S. Cl. .......................... 138/30; 138/26; 220/721

(58) Field of Classification Search .................. 138/30, 138/26; 220/721, 720
See application file for complete search history.

(56) References Cited

U.S. PATENT DOCUMENTS

| | | | | |
|---|---|---|---|---|
| 357,128 | A | 2/1887 | Loretz | 137/207 |
| 407,830 | A | 7/1889 | Loretz | 137/208 |
| 578,505 | A | 3/1897 | Worthen et al. | 137/209 |
| 852,150 | A * | 4/1907 | Whitney | 48/191 |
| 2,261,948 | A * | 11/1941 | Beach | 181/233 |
| 2,652,172 | A | 9/1953 | Negola | 220/495.05 |
| 2,685,887 | A | 8/1954 | Ame | 137/208 |
| 2,735,642 | A * | 2/1956 | Norman | 251/5 |
| 2,760,518 | A * | 8/1956 | Peet | 138/30 |
| 2,838,073 | A * | 6/1958 | Bruce et al. | 138/30 |
| 2,896,862 | A | 7/1959 | Bede | 239/332 |
| 3,057,509 | A | 10/1962 | Bernd | 220/591 |
| 3,331,399 | A * | 7/1967 | Von Forell | 138/30 |
| 3,536,102 | A * | 10/1970 | Zahid et al. | 138/30 |
| 3,623,629 | A | 11/1971 | Hendershot | 220/661 |
| 4,186,775 | A * | 2/1980 | Muroi | 138/30 |
| 4,313,400 | A | 2/1982 | Walker et al. | 122/31.1 |
| 4,314,621 | A * | 2/1982 | Hansen | 181/233 |
| 4,514,295 | A * | 4/1985 | Mathieu et al. | 210/90 |
| 4,779,757 | A | 10/1988 | Fuckert et al. | 220/4.12 |
| 4,796,676 | A | 1/1989 | Hendershot et al. | 141/83 |
| 4,817,830 | A | 4/1989 | Yavorsky | 222/386.5 |
| 5,064,096 | A | 11/1991 | Illing et al. | 222/105 |
| 5,217,138 | A | 6/1993 | Nichols | 220/495.06 |
| 5,253,778 | A | 10/1993 | Sirosh | 220/590 |
| 5,397,020 | A | 3/1995 | Witt | 73/49.2 |
| 5,522,523 | A | 6/1996 | Nogles | 220/567.3 |
| 5,901,744 | A | 5/1999 | Richards | 137/565.34 |
| 5,954,222 | A | 9/1999 | White et al. | 220/582 |
| 6,029,708 | A * | 2/2000 | Spell et al. | 138/30 |
| 6,418,969 | B1 * | 7/2002 | Bertagna | 138/30 |

OTHER PUBLICATIONS

Website article entitled "Thermoplastic Vulcanizate TPV", 2000, pp. 1-3, Harvest Polymers Ltd.
Website article entitled "Rack 'em up with a Soft Grip Clamp," Machine Design Magazine, 2004, pp. 1-3, Penton Media, Inc. & Machine Design Magazine.

(Continued)

*Primary Examiner*—Patrick Brinson
(74) *Attorney, Agent, or Firm*—Michael Best & Friedrich LLP

(57) ABSTRACT

Some embodiments of the present invention provide an accumulator tank assembly and method in which a flexible bladder is received within an accumulator tank. The accumulator tank and the flexible bladder can each have an inlet aperture through which fluid is received within the accumulator tank assembly and an outlet aperture through which fluid exits the accumulator tank assembly. In some embodiments, inlet and outlet flanges positioned adjacent the inlet and outlet apertures of the accumulator tank are used to couple the flexible bladder to internal or external surfaces of the accumulator tank, thereby creating fluid tight seals between the flexible bladder and the accumulator tank.

23 Claims, 4 Drawing Sheets

OTHER PUBLICATIONS

Website article entitled "Plastics and Rubber", 2004, pp. 1-2, Dow Corning Corporation.

Website article entitled "Thermoplastic Elastomers TPE, TPR", 2003, pp. 1-6, The British Plastics Federation.

* cited by examiner

ACCUMULATOR TANK ASSEMBLY AND METHOD

BACKGROUND OF THE INVENTION

Fluid supply systems in industrial, residential, and commercial environments often include one or more accumulator tanks for insuring that the flow rate and pressure of fluid supplied to various locations is substantially steady. Some accumulator tanks contain a reservoir of fluid that can be supplied to the system at peak demand times in order to maintain a substantially steady fluid flow rate and pressure. At times of lower demand, the fluid supply system can replenish such accumulator tanks with fluid.

Accumulator tanks typically include a rigid outer shell having a single aperture through which fluid can flow to and from the fluid supply system. Accumulator tanks also typically include a flexible bladder made from a porous material, such as butyl rubber, positioned within the rigid outer shell. This flexible bladder also has a single aperture aligned with the aperture in the shell and through which fluid can flow to and from the fluid supply system. Fluid enters and exits the bladder through the aligned apertures, and does not contact the rigid outer shell of the accumulator tank. In order to permit bladder expansion and contraction as fluid enters and exits the accumulator tank, respectively, conventional accumulator tanks often include one or more air holes through the rigid outer shell.

During extended periods of low demand, fluid can remain in the bladder of an accumulator tank for relatively long periods of time. Also, deposits from the fluid can collect within the bladder and can adhere to the internal walls of the bladder (e.g., retained within pores of the rubber material). The tendency of such deposits to accumulate within the bladder increases the difficulty of maintaining clean and sanitary conditions within the accumulator tank.

SUMMARY OF THE INVENTION

Some embodiments of the present invention provide an accumulator tank assembly, comprising an accumulator tank having an inlet aperture through which fluid enters the accumulator tank; an outlet aperture through which fluid exits the accumulator tank; a flange coupled to the accumulator tank and through which fluid passing through the accumulator tank assembly moves, a flexible bladder located substantially within the accumulator tank and releasably coupled to the accumulator tank by the flange, the flexible bladder comprising: an internal volume; an inlet aperture through which fluid enters the flexible bladder; and an outlet aperture through which fluid exits the flexible bladder; wherein the flange is positioned to compress the flexible bladder against the accumulator tank to create a fluid tight seal between the flexible bladder and the accumulator tank; and wherein the flexible bladder is removable from the accumulator tank and has walls movable with respect to the accumulator tank to change the internal volume of the flexible bladder.

In some embodiments, an accumulator tank assembly is provided, and comprises an accumulator tank having an inlet aperture through which fluid enters the accumulator tank; and an outlet aperture through which fluid exits the accumulator tank; a flexible bladder located substantially within the accumulator tank, the flexible bladder comprising an inlet aperture adjacent the inlet aperture of the accumulator tank; an outlet aperture adjacent the outlet aperture of the accumulator tank; an inlet flange releasably coupling the flexible bladder to a surface of the accumulator tank adjacent the inlet apertures of the accumulator tank and the flexible bladder to form a first substantially fluid-tight seal between the accumulator tank and the flexible bladder; and an outlet flange releasably coupling the flexible bladder to a surface of the accumulator tank adjacent the outlet apertures of the accumulator tank and the flexible bladder to form a second substantially fluid-tight seal between the accumulator tank and the flexible bladder; wherein the flexible bladder is deformable within the accumulator tank responsive to changing fluid pressures within the flexible bladder, and is removable from the accumulator tank through at least one of the inlet and outlet apertures of the accumulator tank.

Some embodiments of the present invention provide a method of assembling an accumulator tank assembly, wherein the method comprises: providing an accumulator tank having inlet and outlet apertures through which fluid passes through the accumulator tank assembly; providing a flexible bladder having inlet and outlet apertures through which fluid passes through the accumulator tank assembly; inserting the flexible bladder within the accumulator tank, the flexible bladder deformable within the accumulator tank responsive to changes of fluid pressure within the flexible bladder; clamping a first portion of the flexible bladder to a first surface of the accumulator tank adjacent the inlet aperture of the accumulator tank while leaving at least a portion of the inlet apertures of the accumulator tank and flexible bladder open for fluid flow therethrough; establishing a first substantially fluid tight seal between the flexible bladder and the accumulator tank by clamping the first portion of the flexible bladder; clamping a second portion of the flexible bladder to a second surface of the accumulator tank adjacent the outlet of the accumulator tank while leaving at least a portion of the outlet apertures of the accumulator tank and flexible bladder open for fluid flow therethrough; and establishing a second substantially fluid tight seal between the flexible bladder and the accumulator tank by clamping the second portion of the flexible bladder.

Further features and a better understanding of the present invention, together with the organization and manner of operation thereof, will become apparent from the following detailed description of the invention when taken in conjunction with the accompanying drawings, wherein like elements have like numerals throughout the drawings.

The present invention is not limited in its application to the details of construction and the arrangement of components set forth in the following description or illustrated in the following drawings. The invention is capable of other embodiments and of being practiced in various ways. Also, the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" are used broadly and encompass both direct and indirect connections, couplings, and mountings. In addition, the terms "connected" and "coupled" are not restricted to physical or mechanical connections or couplings.

DETAILED DESCRIPTION

Figure 1:
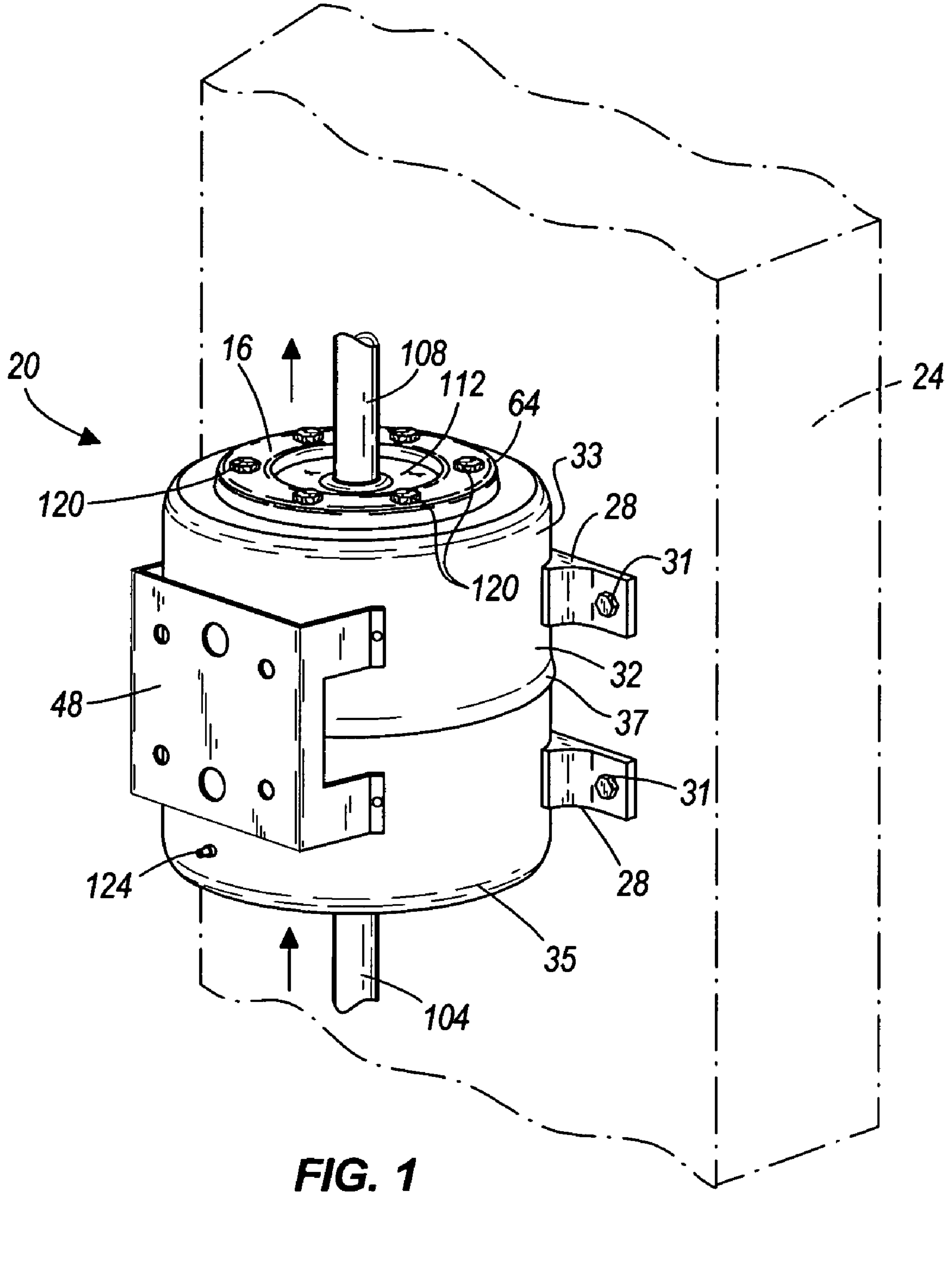
FIG. 1 is a perspective view of an accumulator tank assembly according to an embodiment of the present invention.

FIG. 1 illustrates an accumulator tank assembly 20 according to an embodiment of the present invention. The accumulator tank assembly 20 can include an accumulator tank 32 and a flexible bladder 56, both of which are described in greater detail below.

The accumulator tank assembly 20 can be installed in any fluid supply system (not shown), such as in a water supply system for equipment drawing water in a restaurant, factory, office, residential building, and the like. In other embodiments, the accumulator tank assembly 20 can be installed in systems supplying any other type of fluid.

The accumulator tank assembly 20 can be oriented in any manner desired, such as in a substantially vertical orientation as shown in FIG. 1 or in a horizontal or angled orientation. In the illustrated embodiment of FIGS. 1–4, the accumulator tank assembly 20 is coupled to a wall or other vertical structure 24. The accumulator tank assembly 20 can be mounted to any structure desired (e.g., to a floor, ceiling or other structure of a room, to a stud, panel, pole, or other member, to a rack, frame, or other equipment, and the like). In other embodiments, the accumulator tank assembly 20 is not mounted to any such structure, and is instead retained in position by its connections to inlet and outlet conduits coupled thereto (e.g., inlet pipe 104 and outlet pipe 108 in the illustrated embodiment).

The accumulator tank assembly 20 can be mounted to any structure using one or more support brackets 28. In the illustrated embodiment, two support brackets 28 are used to mount the accumulator tank 32 to the vertical structure 24, although any other number of support brackets 28 can instead be used. The support brackets 28 can be secured to the accumulator tank 32 or other portion of the accumulator tank assembly 20 and to the vertical structure 24 in any manner, such as by welding, brazing, adhesive and/or cohesive bonding material, bolts, screws, rivets, pins, clips, clamps, and other conventional fasteners, inter-engaging elements, snap-fits, and the like. In the illustrated embodiment for example, the support brackets 28 are coupled to the outer shell 32 by welds and are coupled to the vertical structure 24 by bolts 31.

In other embodiments, the accumulator tank assembly 20 can be secured to an adjacent structure in other manners, such as by one or more bosses or flanges on the accumulator tank 32 and/or adjacent structure, by one or more straps, bands, or belts coupled to the adjacent structure and extending at least partially around the accumulator tank 32, and the like.

In some embodiments of the present invention, the accumulator tank assembly 20 can include one or more brackets for mounting one or more devices to the accumulator tank assembly 20. Such brackets can have any shape and size, and can be coupled to the device(s) and the accumulator tank 32 or other portion of the accumulator tank assembly 20 in any of the manners described above with regard to the connections between the support brackets 28 and the accumulator tank 32 and structure 24. In the illustrated embodiment of FIGS. 1–4, a pump bracket 48 is welded to the accumulator tank 32, and is adapted to support a pump 52 (shown in phantom in FIG. 2). The pump 52 can be coupled to the inlet or outlet apertures 40, 44 of the accumulator tank 32 (described below) in a conventional manner for drawing fluid from or moving fluid into the accumulator tank 32. Other devices that can be mounted to the accumulator tank assembly 20 via bracket(s) include filters and other fluid treatment devices, valve assemblies, and the like.

Figure 2:
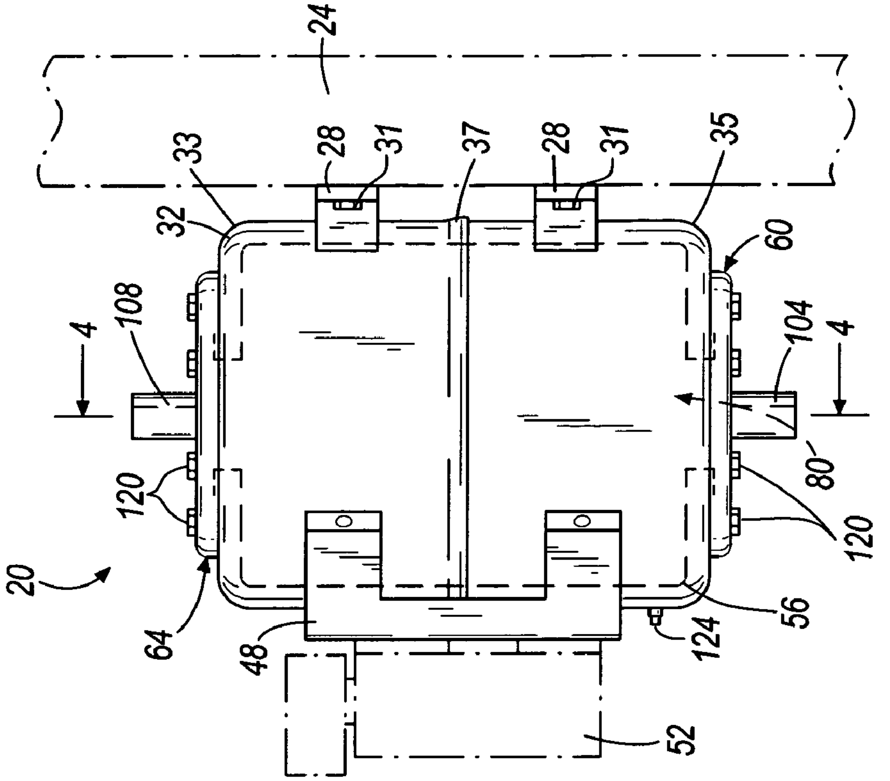
FIG. 2 is a side view of the accumulator tank assembly illustrated in FIG. 1.
Figure 3:
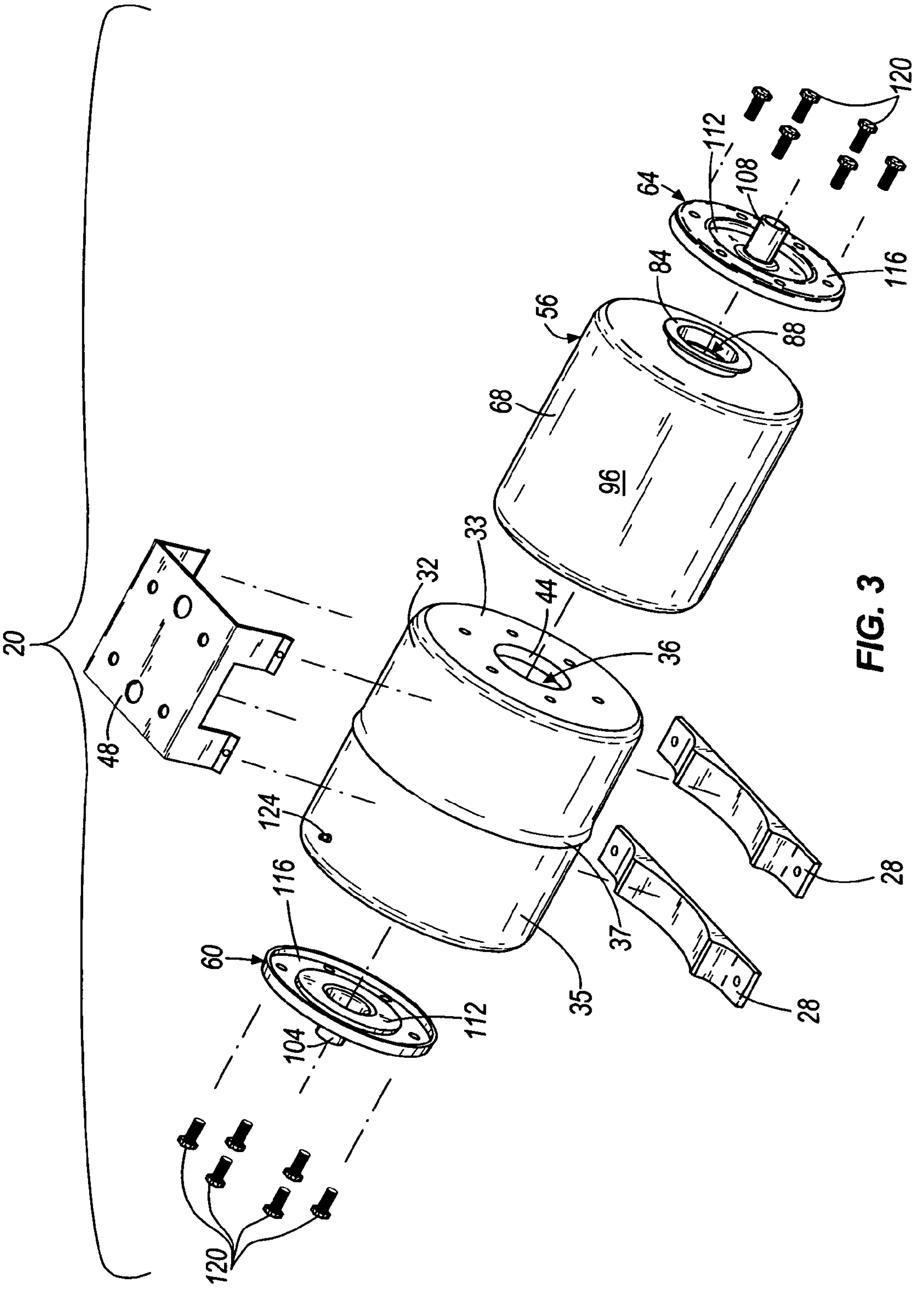
FIG. 3 is an exploded perspective view of the accumulator tank assembly illustrated in FIGS. 1 and 2.

With continued reference to FIGS. 1–3, the accumulator tank 32 can have an internal cavity 36, an inlet aperture 40 and an outlet aperture 44. The accumulator tank 32 in the illustrated embodiment is substantially cylindrical. However, in other embodiments the accumulator tank 32 can have any other shape desired. For example, the accumulator tank 32 can have a substantially rectangular, oval, irregular, or other cross-sectional shape (e.g., in a plane passing through the accumulator tank 32 between the inlet and outlet apertures 40, 44). Also, the inlet and outlet apertures 40, 44 in the illustrated embodiment are substantially round, although these apertures 40, 44 can instead be rectangular, oval, irregular, or can have any other shape desired. In addition, the inlet and outlet apertures 40, 44 need not necessarily have the same shape and size.

The accumulator tank 32 can comprise any rigid material. In the illustrated embodiment, the accumulator tank 32 is stainless steel. In other embodiments, the accumulator tank 32 can comprise brass, aluminum, or other metals, plastic, fiberglass, glass, ceramic, composite materials, and any combination thereof.

The accumulator tank 32 can be constructed of any number of elements each having any size. By way of example only, the accumulator tank 32 illustrated in FIGS. 1–4 has first and second pieces 33, 35 coupled along a circumferential seam 37. The first and second pieces 33, 35 are halves of the accumulator tank 32, although other relative sizes of the first and second pieces 33, 35 are possible. As other examples, the accumulator tank 32 can include end walls coupled to a single cylindrical element, can be constructed of multiple panels coupled in any manner, can be a single integral element, and the like. In those embodiments in which the accumulator tank 32 is constructed of two or more elements, the elements can be permanently or releasably coupled in a number of different manners, such as by welding, brazing, adhesive and/or cohesive bonding material, bolts, screws, rivets, pins, clips, clamps, and other conventional fasteners, inter-engaging elements, snap-fits, and the like. In the illustrated embodiment of FIGS. 1–4 for example, the first and second pieces 33, 35 of the accumulator tank 32 are welded along the circumferential seam 37.

The inlet and outlet apertures 40, 44 of the accumulator tank 32 illustrated in FIGS. 1–4 are located in opposite ends of the accumulator tank 32, and enable fluid to enter and exit the internal cavity 36, respectively. In some embodiments, the inlet and outlet apertures 40, 44 are substantially centrally located in opposite ends of the accumulator tank 32, and can be substantially centered about an axis of rotation of the accumulator tank 32. However, in other embodiments, the inlet and outlet apertures 40, 44 can be in other locations in the accumulator tank 32, such as either or both apertures 40, 44 located in a cylindrical sidewall of the accumulator tank 32, either or both apertures 40, 44 located eccentrically with respect to an axis of rotation of the accumulator tank 32, and the like.

With continued reference to FIGS. 1–4, the accumulator tank assembly 20 can further include a flexible bladder 56 received within the accumulator tank 32. The flexible bladder 56 can comprise a flexible material, including without limitation, a variety of polymers, such as elastomers. For example, the flexible bladder 56 can comprise a natural rubber or a synthetic rubber (e.g., butyl, or other types of rubber). However, the inventors have discovered that flexible material having few or no pores can provide good performance results. In some embodiments, the flexible material can include latex; urethane; thermoplastic elastomer (TPE) or thermoplastic elastomer blend (e.g., a styrene block copolymer (SBS & SEBS), impact modified and super soft polypropylene, thermoplastic vulcanizate (TPV) (e.g., a polyolefinic blend of polypropylene and crosslinked ethylene-propylene diene monomer (EPDM)), thermoplastic polyurethanes (TPU), Melt Processible Rubber (MPR), thermoplastic copolyesters (TPEE), and thermoplastic polyamides); ethyl vinyl acetate (EVA), ethylene propylene diene monomer (EPDM), ethylene propylene copolymer, polyvinyl chloride (PVC), and any combination thereof. In some embodiments, the flexible bladder 56 comprises a TPE-TPV alloy (e.g., a TPE-NEXPRENE® alloy; NEXPRENE® available from Solvay Engineered Polymers), which can essentially have no pores and is tasteless.

The flexible bladder 56 can have a body 68 with an internal bladder cavity 72. The body 68 can have any shape desired, including any of the shapes described above with reference to the accumulator tank 32. In some embodiments, the body 68 has a shape complimentary to the shape of the accumulator tank 32. Also, when the flexible bladder 56 is positioned within the internal cavity 36 of the accumulator tank 32, a gap 92 can be defined between an outer surface 96 of the flexible bladder 56 and an inner surface 100 of the accumulator tank 32. In some embodiments, the flexible bladder 56 is sized and shaped to engage the inner surface 100 of the accumulator tank 32 with the outer surface 96 of the flexible bladder 56 so that no gap 92 (or substantially no gap 92) exists between one or more portions, a majority, or substantially all of the flexible bladder 56 and the accumulator tank 32.

In some embodiments, the flexible bladder 56 can also have an inlet aperture 80 and an outlet aperture 88 through which fluid can enter and exit the flexible bladder 56, respectively. The inlet and outlet apertures 80, 88 in the illustrated embodiment are substantially round, although the inlet and outlet apertures 80, 88 can instead be rectangular, oval, irregular, or can have any other shape desired. In addition, the inlet and outlet apertures 80, 88 need not necessarily have the same shape and size.

The inlet and outlet apertures 80, 88 of the flexible bladder 56 illustrated in FIGS. 1–4 are located in opposite ends of the flexible bladder 56, and enable fluid to enter and exit the bladder cavity 72, respectively. In some embodiments, the inlet and outlet apertures 80, 88 are substantially centrally located in opposite ends of the flexible bladder 56, and can be substantially centered about an axis of rotation of the flexible bladder 56. However, in other embodiments, the inlet and outlet apertures 80, 88 can be in other locations in the flexible bladder 56, such as either or both apertures 80, 88 located in a sidewall of the flexible bladder 56, either or both apertures 80, 88 located eccentrically with respect to an axis of rotation of the flexible bladder 56, and the like.

With continued reference to the embodiment of FIGS. 1–4, the flexible bladder 56 can be positioned within the internal cavity 36 of the accumulator tank 32 so that the apertures 80, 88 of the flexible bladder 56 are substantially aligned with the apertures 40, 44 of the accumulator tank 32. In some embodiments, the flexible bladder 56 can have an inlet bladder flange 76 adjacent the inlet aperture 80 of the flexible bladder 56 and/or can have an outlet bladder flange 84 adjacent the outlet aperture 88 of the flexible bladder 56. These inlet and outlet bladder flanges 76, 84 can extend through the inlet and outlet apertures 40, 44 of the accumulator tank 32 when the flexible bladder 56 is positioned within the accumulator tank 32. In some embodiments, the inlet and outlet bladder flanges 76, 84 can also extend radially away from the inlet and outlet apertures 40, 44 in the accumulator tank 32 (see, for example, FIG. 4 of the illustrated embodiment).

In the embodiment of FIGS. 1–4, the flexible bladder 56 is coupled to the accumulator tank 32 by inlet and outlet flanges 60, 64 located adjacent the inlet and outlet apertures 40, 44 of the accumulator tank 32, respectively. The inlet and outlet flanges 60, 64 can comprise any rigid or substantially rigid material, including any of the accumulator tank materials described above. Although the inlet and outlet flanges 60, 64 illustrated in FIGS. 1–4 are substantially round, the inlet and outlet flanges 60, 64 can have any other shape capable of coupling the flexible bladder 56 to the accumulator tank 56 as described in greater detail below, and need not necessarily surround the inlet and outlet apertures 40, 44 of the accumulator tank 32 as shown in FIGS. 1–4.

The inlet and outlet flanges 60, 64 can be coupled to the accumulator tank 32 by fasteners 120 threaded into threaded apertures in the accumulator tank 32 (and/or into nuts located within the accumulator tank 32). The fasteners 120 can be a plurality of bolts as shown in FIGS. 1–4, enabling the inlet and outlet flanges 60, 64 to be loosened (and in some cases, removed) in order to remove the flexible bladder 56 from the accumulator tank 32. In other embodiments, other types of fasteners and fastening methods can be used to releasably or permanently couple the inlet and outlet flanges 60, 64 to the accumulator tank 32, including without limitation screws, rivets, pins, clips, clamps, and other conventional fasteners, adhesive or cohesive bonding material, and the like.

The inlet and outlet flanges 60, 64 can be positioned to clamp a portion of the flexible bladder 56 against the accumulator tank 32, or to otherwise clamp the flexible bladder 56 with respect to the accumulator tank 32 (such as in cases where another element is located between the flexible bladder 56 and the accumulator tank 32). For example, the inlet and outlet flanges 60, 64 can clamp the flexible bladder 56 against exterior surfaces of the accumulator tank 32 adjacent the inlet and outlet apertures 40, 44 of the accumulator tank 32. In some embodiments, the inlet and outlet flanges 60, 64 clamp the inlet and outlet bladder flanges 76, 84 with respect to the accumulator tank 32, although other portions of the flexible bladder 56 can instead be clamped. For example, in some alternative embodiments, either or both end walls of the flexible bladder 56 can be clamped against internal surfaces of the accumulator tank 32 (described in greater detail below).

Figure 4:
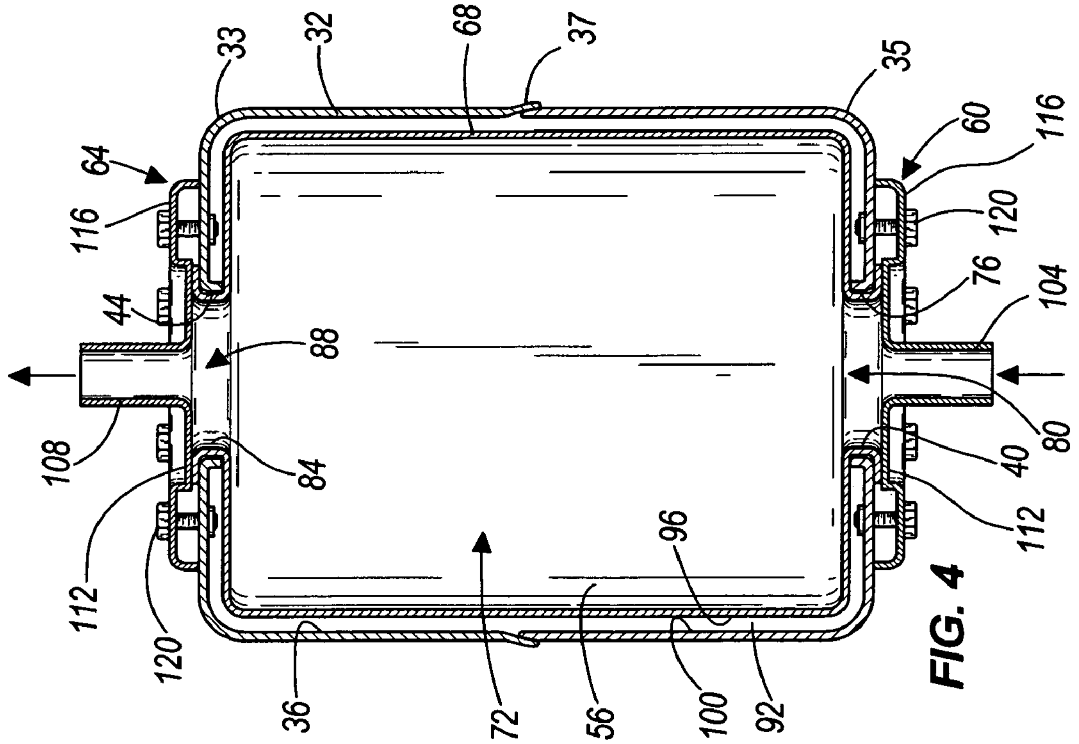
FIG. 4 is a cross-sectional side view of the accumulator tank assembly illustrated in FIGS. 1–3, taken along line 4—4 in FIG. 2.

With reference to FIGS. 3 and 4, when the fasteners 120 are tightened, the inlet and outlet flanges 60, 64 compress the inlet and outlet bladder flanges 76, 84 against external portions of the accumulator tank 32 surrounding the inlet and outlet apertures 40, 44 of the accumulator tank 32. Any portion of the inlet and outlet flanges 60, 64 can exert this force. In some embodiments, the inlet and outlet flanges 60, 64 correspond in shape to the adjacent external surfaces of the accumulator tank 32 (e.g., are substantially flat or curved to match substantially flat or curved adjacent accumulator tank surfaces). Also, in some embodiments, only one or more portions of the inlet and outlet flanges 60, 64 compress the flexible bladder 56. By way of example only, the inlet and outlet flanges 60, 64 in the illustrated embodiment have annular portions 112 that are recessed with respect to adjacent raised annular portions 116. When the fasteners 120 passed through apertures in the raised annular portions 116 are tightened, the recessed annular portions 112 exert clamping force upon the inlet and outlet bladder flanges 76, 84.

By clamping the portions of the flexible bladder 56 as described above, a fluid-tight seal can be formed between the flexible bladder 56 and the accumulator tank 32 at or adjacent the inlet and outlet apertures 40, 44 of the accumulator tank 32. Although the inlet and outlet flanges 60, 64 in the illustrated embodiment have an annular shape for this purpose, the inlet and outlet flanges 60, 64 can have any other shape capable of performing this function, including without limitation square and other polygonal shapes, irregular shapes, and the like.

In some embodiments of the present invention, the inlet flange 60 includes an inlet pipe 104 through which fluid passes to enter the accumulator tank 32 and/or the outlet flange 64 includes an outlet pipe 108 through which fluid passes to exit the accumulator tank 32. The inlet and outlet pipes 104, 108 can be integral with the inlet and outlet flanges 60, 64 as best shown in FIG. 2. In other embodiments, the inlet and outlet pipes 104, 108 are separate elements coupled to the other portions of the inlet and outlet flanges 60, 64 in any manner, such as by a threaded connection, by welding, brazing, or bonding material, or in any of the other manners of connection described above with reference to the connections between the support brackets 28 and the accumulator tank 32 and structure 24.

The inlet and outlet pipes 104, 108 can comprise any material desired, and can comprise the same or different material than the other portions of the inlet and outlet flanges 60, 64 (including any of the accumulator tank materials described above). Also, the inlet and outlet pipes 104, 108 can be substantially centrally located with respect to the corresponding inlet and outlet apertures 40, 44 of the accumulator tank 32 and/or the corresponding inlet and outlet apertures 80, 88 of the flexible bladder 56 as best shown in FIG. 4. However, in other embodiments, the inlet and outlet apertures 40, 44 are not aligned in this manner.

As mentioned above, the inlet and outlet flanges 60, 64 of the illustrated embodiment can be clamped against the flexible bladder 56 by tightening the fasteners 120 of the inlet and outlet flanges 60, 64. In other embodiments, the clamping force of the inlet and outlet flanges 60, 64 can be generated in a number of other manners, all of which fall within the spirit and scope of the present invention. For example, the peripheral edge or other portion of the inlet and outlet flanges 60, 64 can be internally or externally threaded, and can be threaded into and tightened upon an annular groove, wall, step, or other feature of the accumulator tank 32. As another example, the inlet and outlet flanges 60, 64 can be provided with one or more protrusions or apertures mating in snap fit or press fit engagement with one or more apertures or protrusions on the accumulator tank 32. Although the inlet and outlet flanges 60, 64 in the illustrated embodiment are the same and perform the bladder clamping function in the same manner, the inlet and outlet flanges 60, 64 in other embodiments can be different in size, shape, manner of connection, and/or manner of clamping.

In some embodiments, the flexible bladder 56 can be secured to the accumulator tank 32 in a variety of other manners still falling within the spirit and scope of the present invention. For example, the accumulator tank 32 can include an inlet flange and an outlet flange positioned within the internal cavity 36 of the accumulator tank 32. In such embodiments, the flexible bladder 56 can be positioned between internal surfaces of the accumulator tank 32 and the inlet and outlet flanges 60, 64. Also in such embodiments, the inlet and outlet flanges 60, 64 can be tightened by fasteners passed through apertures in the accumulator tank 32 and inlet and outlet flanges 60, 64, by mating threads on the inlet and outlet flanges 60, 64 and on the accumulator tank 32 (e.g., female threads in the inlet and outlet apertures 40, 44 of the accumulator tank 32 mating with male threads on the inlet and outlet flanges 60, 64, and the like), by press or snap fits between elements or features on internal surfaces 100 of the accumulator tank 32 and the inlet and outlet flanges 60, 64, and the like. In such cases, the ends of the flexible bladder 56 need not extend radially inwardly as far as shown in FIG. 4. Instead, the flexible bladder 56 can extend to the extent necessary to be received between internal surfaces 100 of the accumulator tank 32 and the inlet and outlet flanges 60, 64.

Figure 5:
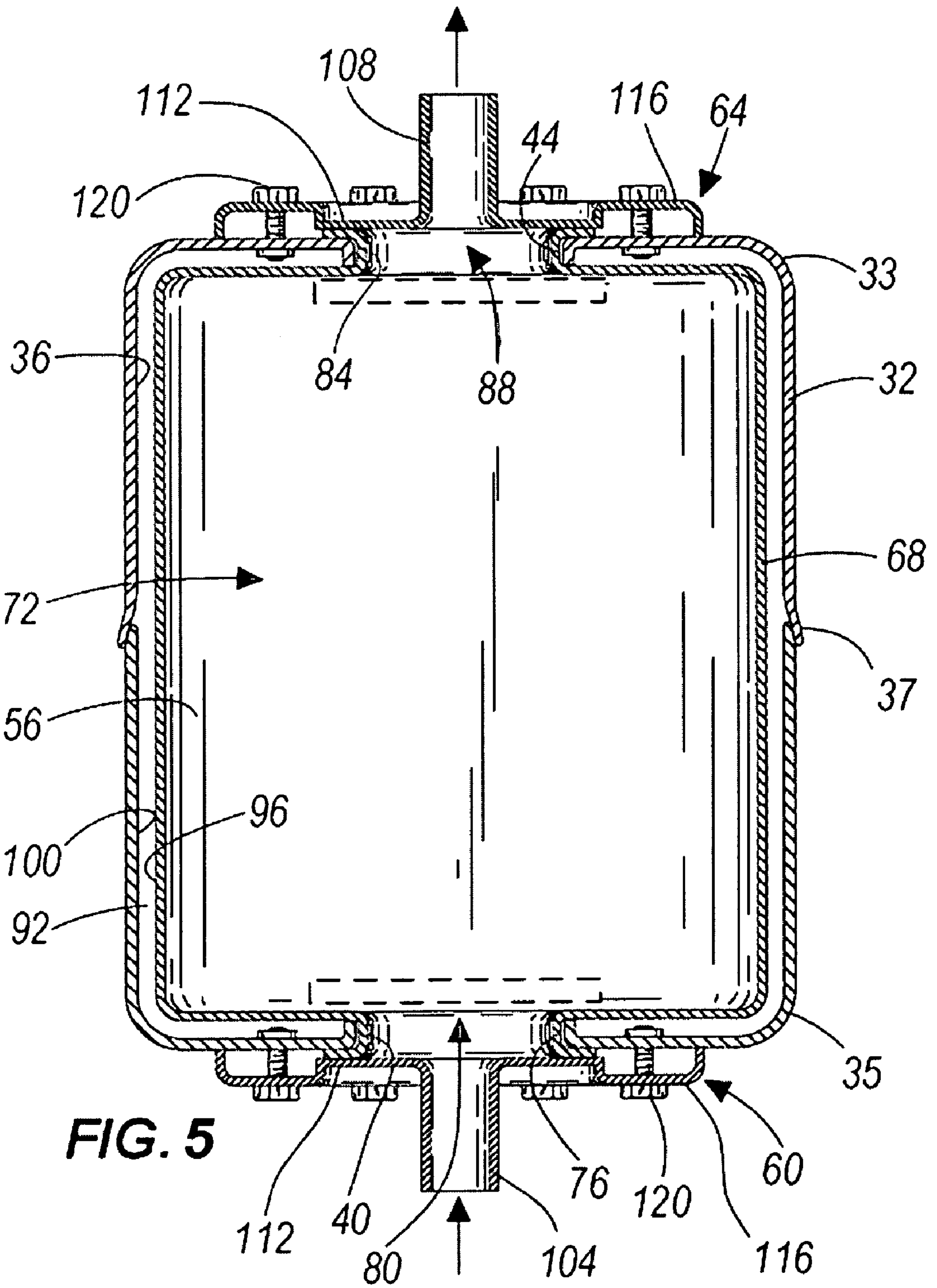
FIG. 5 is a cross-sectional side view of the accumulator tank assembly similar to FIG. 4, illustrating a different embodiment.

In still other embodiments, as illustrated in FIG. 5, the inlet and outlet flanges 60, 64 can include at least a pair of components moveable toward one another to compress portions of the bladder 56 therebetween. For example, each of the inlet and outlet flanges 60, 64 can have component parts on opposite sides of the accumulator tank wall adjacent the accumulator tank inlet and outlet 40, 44. In such cases, the pair of components can be moved relative to each other in a variety of different manners, such as by threading the components of each pair with respect to one another, by sliding the components of each pair with respect to one another (in which case the components can be secured in clamped position by locking grooves and projections, or in any other manner), and the like.

In some embodiments, the accumulator tank 32 includes a valve 124 in fluid communication with the internal cavity 36 of the accumulator tank 32 and, particularly, in fluid communication with the gap 92 of the internal cavity 36 surrounding the flexible bladder 56 when the flexible bladder 56 is positioned with the internal cavity 36. The valve 124 can facilitate the passage of air or other fluid to and from the gap 92 surrounding the flexible bladder 56. In some embodiments, a source of air or other fluid (not shown) can be coupled to the valve 124 to introduce air or other fluid into the gap 92 in order to increase pressure around the flexible bladder 56. Increasing pressure between the accumulator tank 32 and the flexible bladder 56 can increase the pressure within the flexible bladder 56 and, therefore, can increase fluid pressure in the fluid supply system coupled to the accumulator tank assembly 20. The valve 124 can be actuated to release fluid from the gap 92 in order to reduce pressure around the flexible bladder 56. Decreasing pressure between the accumulator tank 32 and the flexible bladder 56 decreases pressure within the flexible bladder 56 and, therefore, can decrease fluid pressure in the fluid supply system coupled to the accumulator tank assembly 20.

With reference to FIGS. 1, 2 and 4, the accumulator tank 32 can be coupled within a fluid supply system, such as a water supply system coupled to a shower, a sink faucet, or other bathroom or kitchen fixtures, a drinking fountain, a bar gun, a drink dispensing machine, an ice maker, and the like. In some constructions, the accumulator tank 32 can be installed in a main fluid supply line (not shown) supplying two or more destinations via secondary fluid supply lines (also not shown) branching from the main fluid supply line. In such applications, the accumulator tank 32 can maintain steady or steadier fluid pressure in the secondary fluid supply lines. In other applications, the accumulator tank 32 can be installed in a secondary fluid supply line supplying fluid to fewer than all destinations of a fluid supply system. In such constructions, the accumulator tank 32 can maintain steady or steadier fluid pressure in the secondary fluid supply line and to the destinations downstream thereof.

In operation, fluid moves through the accumulator tank 32 as fluid is required downstream of the accumulator tank 32. In periods of low fluid demand, the amount of fluid in the flexible bladder 56 can be relatively high, and fluid can move through the flexible bladder 56 at a relatively slow rate. During higher or peak fluid demand periods, fluid can move through the flexible bladder 56 at a relatively fast rate to compensate for the larger volume of fluid consumed downstream. In such periods, the flexible bladder 56 can contract, thereby supplying downstream apparatuses with an additional volume of fluid from the flexible bladder 56. As the demand for fluid decreases downstream, the flexible bladder 56 can expand to receive additional fluid for use in the next high or peak demand period. The amount of fluid in the flexible bladder 56 can be variable to compensate for the varying fluid demands of the fluid supply system and to maintain a steady or steadier fluid pressure at downstream locations.

With reference to FIGS. 3 and 4, in some embodiments the flexible bladder 56 can be removed from the accumulator tank 32, and can be replaced with another flexible bladder 56. Replacement of the flexible bladder 56 can be necessary in cases where the flexible bladder 56 is old or damaged, for cleaning and maintenance, or for other reasons. To remove the flexible bladder 56 illustrated in FIGS. 1–4, the fasteners 120 used to connect the inlet and outlet flanges 60, 64 can be loosened to release the inlet and outlet bladder flanges 76, 84 from between the exterior surface of the accumulator tank 32 and the recessed annular portions 112 of the inlet and outlet flanges 60, 64. In some embodiments, either or both of the inlet and outlet flanges 60, 64 can be completely removed from the accumulator tank 32, such as by completely unthreading the fasteners 120 from the accumulator tank 32. The flexible bladder 56 can be made of a material sufficiently flexible to facilitate removal of the flexible bladder 56 from the shell cavity 36 through the inlet aperture 40 and/or the outlet aperture 44.

After the flexible bladder 56 is removed from the shell cavity 36, another flexible bladder 56 can be inserted into the shell cavity 36 through the inlet aperture 40 and/or the outlet aperture 44. In some embodiments, the inlet bladder flange 76 and the outlet bladder flange 84 can be appropriately positioned to extend out of the inlet aperture 40 and the outlet aperture 44, respectively, of the accumulator tank 32. The fasteners 120 can then be tightened to move the inlet flange 60 and the outlet flange 64 toward surfaces of the accumulator tank 32 and to compress the inlet bladder flange 76 and the outlet bladder flange 84 between the recessed annular portions 112 of the inlet and outlet flanges 60, 64 and the exterior surfaces of the accumulator tank 32. Once the inlet and outlet bladder flanges 76, 84 are sufficiently compressed, the replacement flexible bladder 56 is secured to the accumulator tank 32, and the accumulator tank assembly 20 is ready for operation within the water supply system. In some embodiments, air pressure surrounding the flexible bladder 56 can be increased by coupling an air source to the air valve 124 and introducing pressurized air into the gap 92 surrounding the flexible bladder 56.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An accumulator tank assembly, comprising:
- an accumulator tank comprising an outer surface; an inlet aperture through which fluid enters the accumulator tank; and an outlet aperture through which fluid exits the accumulator tank;
- a flange coupled to the accumulator tank and through which fluid passing through the accumulator tank assembly moves;
- a flexible bladder located substantially within the accumulator tank and releasably coupled to the accumulator tank by the flange, the flexible bladder comprising:
  - an internal volume;
  - an inlet aperture that extends out of the inlet aperture of the accumulator tank through which fluid enters the flexible bladder; and
  - an outlet aperture that extends out of the outlet aperture of the accumulator tank through which fluid exits the flexible bladder;
- wherein the flange is positioned to compress the flexible bladder against the outer surface of the accumulator tank to create a fluid tight seal between the flexible bladder and the accumulator tank; and
- wherein the flexible bladder is removable from the accumulator tank and has walls movable with respect to the accumulator tank to change the internal volume of the flexible bladder.

2. The accumulator tank assembly as claimed in claim 1, wherein the flange is removable from the accumulator tank.

3. The accumulator tank assembly as claimed in claim 1, further comprising at least one adjustable fastener coupling the flange to the accumulator tank.

4. The accumulator tank assembly as claimed in claim 1, wherein the flange is positioned around one of the inlet and outlet apertures of the accumulator tank.

5. The accumulator tank assembly as claimed in claim 1, wherein the flexible bladder is deformable to a shape in which the flexible bladder is removable from the accumulator tank through at least one of the inlet and outlet apertures of the accumulator tank.

6. The accumulator tank assembly as claimed in claim 1, wherein the flange is positioned to compress the flexible bladder against an internal surface of the accumulator tank to create the fluid tight seal.

7. The accumulator tank assembly as claimed in claim 1, wherein the flexible bladder comprises thermoplastic rubber.

8. The accumulator tank assembly as claimed in claim 1, wherein the inlet and outlet apertures of the flexible bladder are substantially aligned with the inlet and outlet apertures of the accumulator tank.

9. The accumulator tank assembly as claimed in claim 1, wherein the flange comprises a fluid conduit.

10. The accumulator tank assembly as claimed in claim 1, wherein the flange is an inlet flange and is positioned to compress the flexible bladder against the accumulator tank adjacent the inlet aperture of the accumulator tank.

11. The accumulator tank assembly as claimed in claim 10, further comprising an outlet flange positioned to compress the flexible bladder against the accumulator tank adjacent the outlet aperture of the accumulator tank.

12. An accumulator tank assembly comprising:
- an accumulator tank comprising an external surface; an inlet aperture through which fluid enters the accumulator tank; and an outlet aperture through which fluid exits the accumulator tank;

a flexible bladder located substantially within the accumulator tank, the flexible bladder comprising an inlet aperture adjacent the inlet aperture of the accumulator tank and extending through the inlet aperture of the accumulator tank; and an outlet aperture adjacent the outlet aperture of the accumulator tank and extending through the outlet aperture of the accumulator tank;

an inlet flange releasably coupling the flexible bladder to the external surface of the accumulator tank adjacent the inlet apertures of the accumulator tank and the flexible bladder to form a first substantially fluid-tight seal between the accumulator tank and the flexible bladder; and an outlet flange releasably coupling the flexible bladder to the external surface of the accumulator tank adjacent the outlet apertures of the accumulator tank and the flexible bladder to form a second substantially fluid-tight seal between the accumulator tank and the flexible bladder;

wherein the flexible bladder is deformable within the accumulator tank responsive to changing fluid pressures within the flexible bladder, and is removable from the accumulator tank through at least one of the inlet and outlet apertures of the accumulator tank.

13. The accumulator tank assembly as claimed in claim 12, wherein at least one of the inlet and outlet flanges are removable from the accumulator tank.

14. The accumulator tank assembly as claimed in claim 12, wherein the inlet and outlet flanges extend around the inlet and outlet apertures of the accumulator tank, respectively.

15. The accumulator tank assembly as claimed in claim 12, wherein at least one of the inlet and outlet flanges releasably couples the flexible bladder to an external surface of the accumulator tank.

16. The accumulator tank assembly as claimed in claim 12, wherein at least one of the inlet and outlet flanges releasably couples the flexible bladder to an internal surface of the accumulator tank.

17. The accumulator tank assembly as claimed in claim 15, wherein the flexible bladder is clamped against the external surface of the accumulator tank by the at least one of the inlet and outlet flanges.

18. The accumulator tank assembly as claimed in claim 16, wherein the flexible bladder is clamped against the internal surface of the accumulator tank by the at least one of the inlet and outlet flanges.

19. The accumulator tank assembly as claimed in claim 12, wherein the flexible bladder comprises thermoplastic rubber.

20. A method of assembling an accumulator tank assembly, the method comprising:

providing an accumulator tank having inlet and outlet apertures through which fluid passes through the accumulator tank assembly;

providing a flexible bladder having inlet and outlet apertures through which fluid passes through the accumulator tank assembly;

inserting the flexible bladder within the accumulator tank, the flexible bladder deformable within the accumulator tank responsive to changes of fluid pressure within the flexible bladder;

clamping a first portion of the flexible bladder to an outer surface of the accumulator tank adjacent the inlet aperture of the accumulator tank while leaving at least a portion of each of the inlet apertures of the accumulator tank and flexible bladder open for fluid flow therethrough;

establishing a first substantially fluid tight seal between the flexible bladder and the accumulator tank by clamping the first portion of the flexible bladder;

clamping a second portion of the flexible bladder to the outer surface of the accumulator tank adjacent the outlet aperture of the accumulator tank while leaving at least a portion each of the outlet apertures of the accumulator tank and flexible bladder open for fluid flow therethrough; and establishing a second substantially fluid tight seal between the flexible bladder and the accumulator tank by clamping the second portion of the flexible bladder.

21. The method as claimed in claim 20, wherein inserting the flexible bladder comprises inserting the flexible bladder through one of the inlet and outlet apertures of the accumulator tank.

22. The method as claimed in claim 20, wherein the outer surface of the accumulator tank is an annular surface.

23. The method as claimed in claim 20, further comprising positioning a portion of the flexible bladder through the inlet aperture of the accumulator tank.

* * * * *